METHOD AND APPARATUS FOR DECORATING PASTRY AND THE LIKE

Original Filed Sept. 15, 1964 2 Sheets-Sheet 1

Inventor
John MacManus

By
McCanna, Marshall & Pillote
Attorneys

METHOD AND APPARATUS FOR DECORATING PASTRY AND THE LIKE

Original Filed Sept. 15, 1964 2 Sheets-Sheet 2

Inventor
John MacManus
By
McCanna, Morshed & Pellote
Attorneys

United States Patent Office

Re. 27,780
Reissued Oct. 9, 1973

27,780
METHOD AND APPARATUS FOR DECORATING PASTRY AND THE LIKE

John MacManus, 143—16 22nd Road,
Whitestone, N.Y. 11357

Original No. 3,285,202, dated Nov. 15, 1966, Ser. No. 396,606, Sept. 15, 1964. Application for reissue Mar. 13, 1972, Ser. No. 234,420
Int. Cl. A21d *13/08;* A23g *3/20, 3/28*
U.S. Cl. 99—92 21 Claims

Matter enclosed in heavy brackets [ ] appears in the original patent but forms no part of this reissue specification; matter printed in italics indicates the additions made by reissue.

*ABSTRACT OF THE DISCLOSURE*

*Method of decorating a succession of units of pastry with a flowable decorating material by utilizing pump pressure to dispense the material thru a flexible hose into a flexible bag having a decorating tip. The filled bag is then manipulated thereby dispensing the material onto the article to be decorated. An apparatus is disclosed for carrying out the above described method.*

This invention relates generally to the art of handling relatively thick flowable material but particularly for products containing a high ratio of air to liquid and solids content and is herein described with particular reference to a method and apparatus for depositing topping in decorative and ornamental designs on cakes, pies and other foodstuffs. Although there is a great demand for commercial bakery goods decorated with topping, of which whipped cream is an instance, competition in the bakery industry has necessitated the use of methods and apparatuses geared to high production by commercial bakers. However, such methods and apparatuses even though most expensive have often been unprofitable to use by commercial bakers due to inadequate versatility and lack of control in depositing topping in an efficient but particularly in a flexible manner on pastry. Often the important decorative and ornamental whirls, spirals, pinwheels and other topping configurations imparting sales appeal to pastry and applied in an efficient manner is the difference that means life or death to the business of the commercial baker, particularly the baker who makes high quality products or the so called retailer of bakery products.

On the North American Continent, and now even in many of the European countries, the high cost of labor and the lack of skilled craftsmen has curtailed and is curtailing the availability of fine decorated pastries of the type having scroll like and other extremely fancy individualistic designs. These have been produced by specialized craftsmen who have had long and varied training and experience, particularly in European countries, where high class fancy or decorated pastries are in demand. However, the difficult and exhaustive hand pressures which must be employed in making such items and the night work commonly involved, make the work unattractive and thus there is a problem of obtaining personnel for training apprenticeships which has created a dearth of craftsmen.

Numerous attempts have been made to develop equipment effective to aid in the production of such designs with less work and greater speed and some of these attempts have been successful to the extent of producing simple but stereotype designs. However, this equipment is frequently elaborate, costly, completely lacks versatility, and must be operated under strictly controlled conditions.

Attempts have been made by others and myself to employ a hose connected to a pressure tank or pump as the source of product supply and to control the pump or the source of supply. It has been found to be relatively impossible in this manner to control, with the necessary accuracy, the flow of pressurized topping or other decorating substance, particularly the high overrun type such as whipped cream or the like. Because of the pressure on the product and within the hose and the compressible nature of the product, serious oozing of the material occurs at the end of the hose, which, of course, destroys the design or the possibility of producing an intricate design.

In this regard it should be noted that the smaller the pastry piece, such as pieces 1" x 2½", the greater is the requirement for flexibility and positively controlled flow of topping without oozing. Otherwise as the hop is made from one small piece to the next, the oozing defaces the following piece. It should also be observed that the higher the pressure applied to the material, to increase the output speed, and the longer the delivery tube, the greater is the percentage of ooze between the starting and stopping of the mechanism. Furthermore, when any substantial amount of air is incorporated in the product which is to be piped, the problems of accuracy in weight and size control increase at the discharge tip in direct proportion to the amount of air in the product i.e. overrun from a low of 5% to over 300% which is a range found in processes in the food industry. The wide range requirement and the great varieties involved have frustrated machine makers with the result that a fast operating flexible machine substitute has never until now been found to supplant or sub-ordinate the need for skilled craftmen in the making of fancy pastries and the like.

Efforts have also been made to instantaneously stop and start the product flow by employing a stop and start cut-off valve at the delievery end of a hose attached to a continuous source of supply. With this arrangement oozing of the decorating substance does not occur but other more serious problems result. With this structure, when the cut-off valve is closed and then reopened, as is required on moving the tip from one pastry item to another, the decorating substance spurts out abruptly from the tip. When using decorating substances of low specific gravity (highly aerated) this spurting causes previously formed designs to be destroyed, thus resulting in a "cripple." [when] *When* the specific gravity is high the spurting action is of lesser intensity but still inappropriate for artistic decorating purposes.

A quick acting cut-off valve in combination with a continuous feed system can achieve a small degree of control for the decorating operator if the operator manipulates the on-off control features of the feed system himself in rhythm with the on-off positions of the cut-off valve. Effective end results, however, depend heavily on the concentrated skill of the operator in developing a "feel" for the overall arrangement. In practice it has been found that even the most skilled and practiced operator will tend to run an abnormal percentage of cripples. The objection to this arrangement is the fact that the effective operation of the arrangement tends to demand concentrated effort on the part of the operator. The nature of this effort is such that it leads to fatigue and adverse results under extended operating conditions.

These problems preclude the possibility of regularly making commercially acceptable fancy decorated pastry and similar products in the manners described. The ratio of passable or acceptable saleable product, as against non-saleable product, is too low to be economically feasible. This is the major reason why the use of a craftsmen has, until the advent of this invention, been the only means for making fancy pastries and the like.

Adequate means to effect a variety of intricate, tidy yet widely variable, non-rigid configurations in an efficient manner is of prime concern to the entrepreneur and it is a general object of this invention to provide such means.

It is an object of this invention to provide a low cost, flexible means for accurate and distinct deposition of topping to foodstuffs and the like.

It is an object of this invention to provide a method and apparatus for depositing topping on a commercial basis which may be operated and used by relatively unskilled craftsmen and requires but a single hand for manipulation to create decorative and ornamental configurations and yet allow them to maintain a relatively high production rate, and without fatigue which is normally caused by the operator having to fill the usual Savoy bag, squeeze to empty its contents then repeat these actions on a continuing basis throughout short or long production runs.

It is another object of this invention to provide a method and apparatus for deposition of topping on foodstuffs in commercial activities, the method and apparatus characterized by effecting a high degree of sanitation with consequent benefit to the plant or shop activities, and greater cleanliness in foods for the consuming public.

It is another object of this invention to provide a novel method and apparatus for depositing topping or foodstuffs, the method and apparatus characterized by a high degree of flexibility to accommodate varying sizes of units which may be supplied at varying speed rates.

It is yet a further object of this invention to effect the aforesaid objects by a combination of a collapsible flexible bag attached to apparatus for continually supplying topping to the bag, the bag being adapted for flexible manual manipulation to deposit the topping, the apparatus preferably being adjustable to adjust the topping output rate.

Further and additional objects and advantages will appear from the description, accompanying drawings and the appended claims.

An embodiment of the apparatus herein illustrated comprises a flexible conduit for providing either a continuous or pulsating flow of topping to the situs of the units, means for providing a continuous or pulsating flow of topping through the conduit, and a collapsible and flexible type baker's pastry bag having a dispensing outlet or tip, the bag being connected to the discharge end of the conduit. Preferably, means are provided to vary the rate of either continual or pulsating flow of material to the bag. The flexible bag is adapted for suitable manual manipulation whereby decorative and ornamental deposition of topping on either an individual item or on a plurality of units simultaneously may be effected to impart sales appeal to the units.

The invention, both as to structure and method, will be better understood by reference to the following description and drawings of a preferred embodiment of the invention:

FIG. 3 is a fragmentary view showing the mounting strap attached to the bag;

Figure 1:
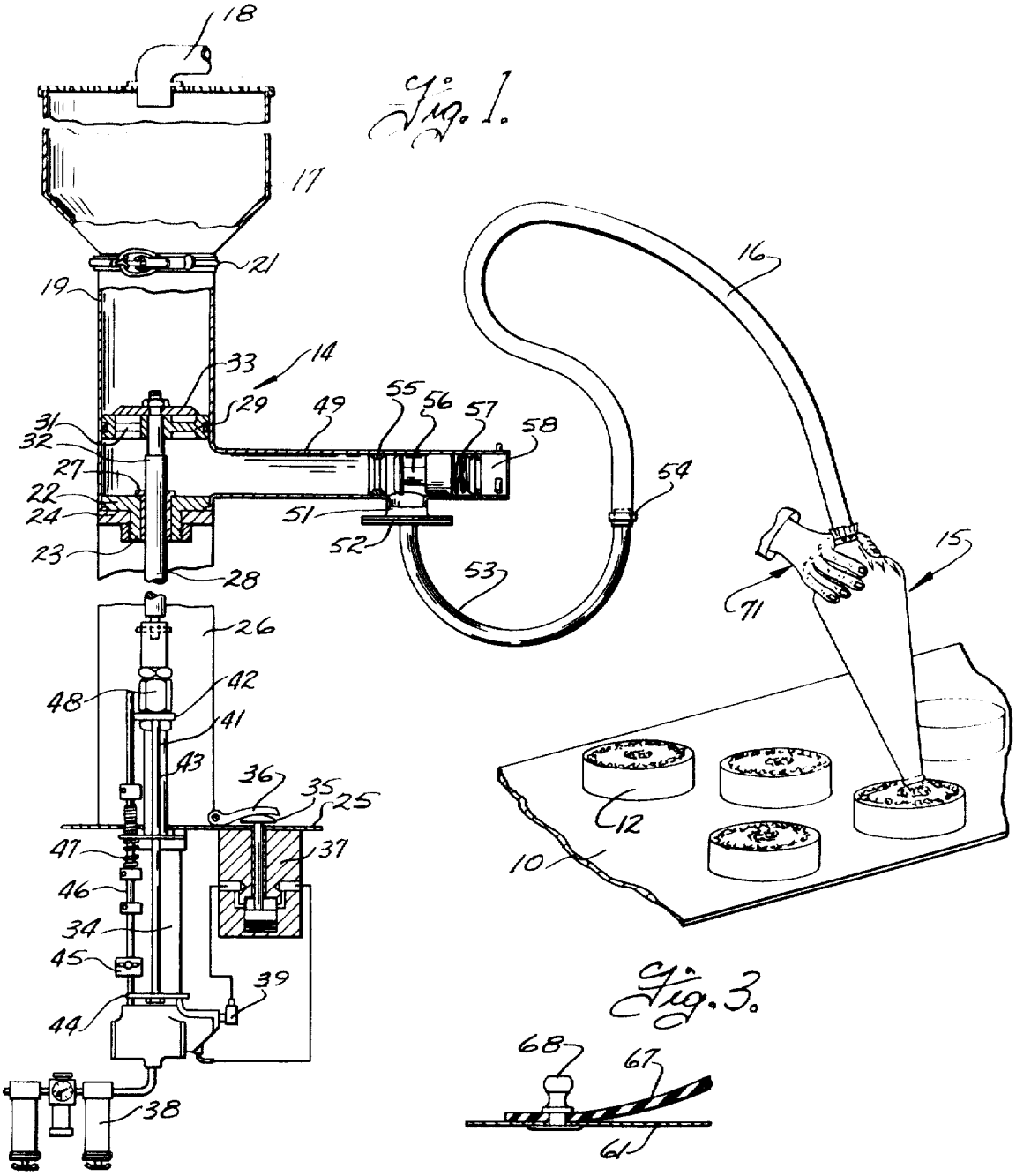
FIG. 1 illustrates the apparatus in use to deposit topping on a plurality of cakes.

Referring to the drawings, and particularly to FIG. 1, there is illustrated a preferred embodiment of the decorating apparatus wherein the numeral 14 generally indicates a pumping apparatus for pumping decorating material, the output of the pump being connected to a flexible and collapsible pastry bag 15 through a flexible conduit or hose 16.

The decorating apparatus will normally be used in connection with a conventional support 10 for holding the objects to be decorated, such as cakes 12, and in practice this will frequently be a conveyor for moving the objects past the operator for performance of the decorating operation.

The pumping apparatus is preferably, though not necessarily, in the form shown in FIG. 1 and indicated generally by the numeral 14, this specific apparatus being disclosed more in detail in my copending application, Serial Number 259,012, filed February 18, 1963, now Patent No. 3,230,906. This pumping apparatus includes a hopper 17 to which topping such as whipped cream or similar aerated products or filling material such as icings, custard and the like, may be supplied in a continuous or intermittent flow through a conduit 18. The hopper is carried on and secured to the top of a pump cylinder 19 by a clamp ring 21 and the hopper is in open communication with the upper end of the cylinder. Secured in the bottom end of the cylinder 19 is a cylinder base block 22 having an externally threaded flange 23 extending through an aperture in a horizontal bracket section 24 in turn supported on a platform 25 by spaced upright legs 26. Passing through the flange 23 and through a bearing sleeve 27 is a piston rod 28. A pump piston 29 is disposed in the cylinder 19, mounted for lost motion connection on the upper end of the piston rod, the piston having one or more ports 31 therethrough. The piston rod has a portion of reduced diameter formed by a shoulder 32 spaced from the upper end thereof and attached to the end of the rod is a valve member 33. When the rod moves upwardly from the lowermost point of its stroke as shown in FIG. 1, the reduced portion of the rod slides through the piston until the shoulder 32 strikes the lower side of the piston. During this movement the valve member 33 moves away from the piston thus uncovering the ports 31. Continued movement of the rod raises the piston in the cylinder and the decorating material flows through the ports to the lower side of the piston. On the subsequent down stroke of the rod, the rod first moves downwardly with respect to the piston until the valve member engages the upper side of the piston closing the ports and thereafter pressure is supplied to the material below the piston to move the same out of the cylinder in a dispensing stroke.

Pump 14 is actuated at a preselected output rate by an air cylinder 34. The air cylinder is energized by depressing a button 35 mounted in a location convenient to the operator such as on platform 25, and, the button may be held in the depressed position by pivot lever 36. When the button is depressed a valve 37 will open and air pressure from a remote source passing through a cleaning device 38 will supply air pressure to the cylinder intake 39. Air entering intake 39 will actuate an air motor piston rod 41. As piston rod 41 rises, an arm 42, connected to a push rod 43 and piston rod 41, rises causing rod 43 to rise also. A trip block 44, affixed to the lower end of push rod 43 engages an adjustable rod clamp 45 mounted on a trip rod 46. As trip rod 46 rises, it reverses a valve in the cylinder, causing piston rod 41 to descend. A spring 47, compressively disposed to bias trip rod 46 downwardly, urges the trip rod to its rest position as the cylinder piston rod 41 descends, whereupon the valve in the cylinder is again reversed. Thus the air cylinder will cycle continuously, and, pump piston rod 28, connected to air cylinder piston rod 41 through coupling 48, will move up and down as the air cylinder cycles. Furthermore, the output rate may be regulated by selectively positioning rod clamp 45 on trip rod 46. By resetting adjustable rod clamp 45 up or down on trip rod 46, the length of stroke of rods 28 and 41 will be increased or decreased respectively, to thus very the amount of material delivered by the pump. An air cylinder such as a commercial product of Bellows-Valvair of Akron, Ohio, referred to as Model BCAEM2–60 Air Motor, or *an* equivalent moled by Lehigh, Inc. of Easton, Pennsylvania, may be employed.

A horizontal pipe 49 is welded to pump cylinder 19 and from this pipe a short discharge pipe 51 depends and attached thereto as by a flanged coupling 52 is a rigid discharge conduit 53. The inlet end of hose 16 is connected to the conduit 53 by any suitable coupling such as shown at 54. In some instances a check valve may be found desirable and in that event a valve seat 55 is mounted in pipe 49 against which will normally seat a check valve 56 biased toward closed position by a light spring 57 held in place by a plug 58. The plug may be conveniently secured to the end of the pipe 49 by a bayonet connection. The check valve thus insures the material will flow in one direction.

Bag 15 may be made of a sheet of pliable, flexible material such as polyethylene and may therefore be disposable, since a bag from this material is reasonably low in cost. The sheet is formed into a straight-sided cone 61 having an open tip outlet end and may be reinforced adjacent the end by a reinforcing band 62. A more substantial bag, for more permanent use, may be made from material such as plastic coated cloth. This type of bag requires a periodical sterilization and washing to comply with exacting sanitary requirements. While the specific size of the bag will vary according to production requirements, an overall length of about 10" to 12" from inlet to outlet with a maximum diameter of about 5" at the point of largest diameter when filled and with a 1" opening at the outlet has been found to be acceptable for a wide range of use and convenient in use.

Figure 2:
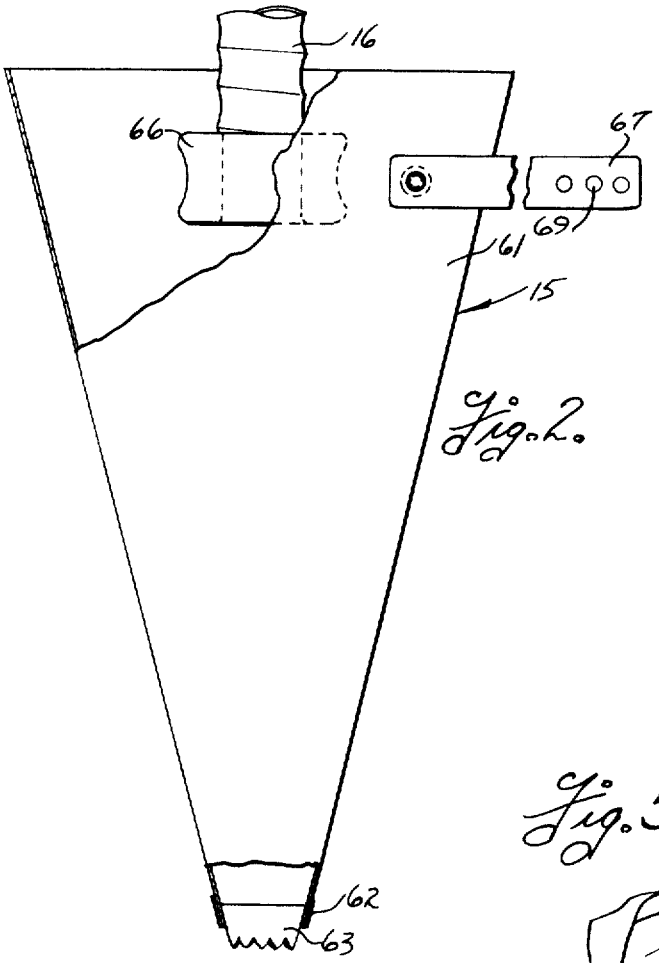
FIG. 2 is a fragmentary view of the collapsible bag shown in FIG. 1 illustrating the manner of mounting the same on the hose.

Supported in the outlet end of the bag 15 is an open ended metal cone or tip 63 which is introduced into the bag from the large end and allowed to protrude through the opening at the end of the bag as best shown in FIG. 2. A common form of tip is that referred to as a "star tube" tip which has an open end provided with lateral notches such that the decorating material flowing therethrough assumes a star-like configuration in cross-section. Other open ended cones are commonly employed, for special effects. However, in any event, the tip and the end of the bag must be open at all times and there must be no valves or other closure means at the tip. The presence of any such structure would be fatal to the proper operation of the apparatus and would preclude the possibility of employing the methods herein described.

Figure 6:
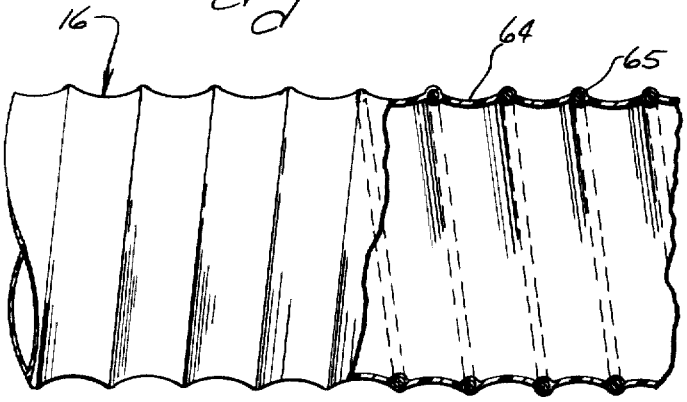
FIG. 6 is a fragmentary view, partly in section, showing the host construction.

Conduit 16 may be made from many different materials but synthetic resins such as "Tygon" manufactured by U.S. Stoneware Company, has been found eminently suitable for the purpose. Preferably the tube is, as shown in FIG. 6, in the form of a relatively thin tube 64 of suitable synthetic resin such as "Tygon" in which is embedded a helix of flexible wire 65 to support the thin tube yet permit maximum flexibility with minimum weight. Tubes of this general type are commonly used in connection with portable hair dryers and similar applications where strength and flexibility are important factors. While the length and size of the conduit or hose will vary according to usage and the desirable output, a length of about 12" to 48", and an inside diameter of ½ to 1¼" generally performs adequately over a wide range of complex and diversified uses in the food industry. The length of the hose 16 will, of course, be sufficient to extend from the apparatus 14 to the site of the pastry decorating operation. This flexible hose allows the operator to freely move the collapsible bag from one pastry unit to another and to manipulate the bag to perform the necessary operations, whereby the operator may employ his own skill by depositing decorative and ornamental configurations of topping or the like on the units. A relatively inflexible conduit tends not to allow free movement of the bag in the course of the decorating operations and an extremely flexible conduit tends to kink or collapse the walls and thereby interrupt the smooth flow of material.

Figure 4:
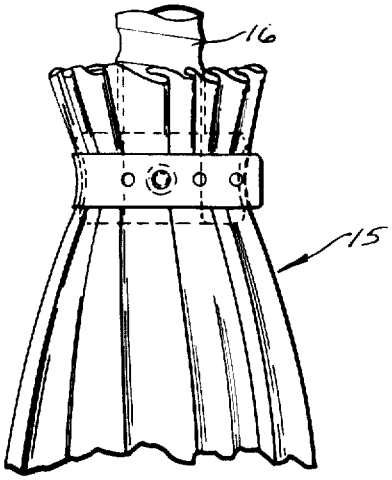
FIG. 4 is an elevational view showing the manner in which the bag is gathered about the end of the hose for attachment thereto.

A convenient means to connect the discharge end of the conduit 16 to the upper portion of the bag 15 is illustrated in FIGS. 2, 3 and 4. A male member 66 in the general form of a collar wherein the diameter of the collar adjacent its two ends is greater than that in the center, as shown in FIG. 2, is affixed to the discharge end of hose 16. This collar may be molded from material such as nylon, polyester resin or high density polyethylene and may be molded directly to the end of the hose or affixed thereto by an adhesive. The upper end of the bag forming the base of the cone has a flexible strap 67 attached thereto at one end and riveted or otherwise secured to the bag. This securing means also includes a button 68 (see FIG. 3) adapted to be received in holes 69 in the strap. This enables the upper end of the bag to be gathered about the collar 66 as illustrated in FIG. 4 and secured thereon by wrapping the strap about the end of the bag to gather the material against the collar and retain the bag in place by insertion of the button 68 through a suitable hole 69.

The apparatus described is well suited to enable an operator to perform decorating procedures in a [higly] *highly* versatile manner, utilizing his acquired skills to produce all of the artistry possible with prior craftmanship methods but at speeds heretofore not obtainable by such craftsman and with improved sanitation and reduced physical effort. In use the operator starts the mechanism including the apparatus 14 or such other equipment as may be available to provide continuous or pulsating feed of decorating material and the rate of operation of the feed mechanism is adjusted to provide a rate of flow suitable for the decorating operation to be performed. This acts to fill the system with decorating substance, including the hose and at least part of the bag. If the operator is faced with the requirement to decorate continuously he allows the bag to become tautly filled and the decorating substance to flow from the tip under the feeding pressure. He then need only hold the bag, usually with only one hand designated by the numeral 71 in FIG. 1, and guide the tip as desired.

In contrast to prior wholly manual methods of decorating as employed by craftsman, the bag employed in this method is comparatively small, ideally not more than about [12)] 12" long and the tubing is light, the entire assembly thus being small and light in weight so that the operator can handle the bag and decorate with one hand, leaving the other hand free to position the material to be decorated and thereby reducing production stoppages. Furthermore, squeezing fatigue is virtually eliminated and production stoppages for bag filling are completely eliminated. The rate of flow at the tip will be theoretically equivalent to the output of the pump 14. The bag *absorbs* [aborbs] any pulsations of the pump and the flow of decorating material will be even and constant in cross cross-section as is highly desirable for decorating purposes. When small interruptions occur or it is necessary to have momentary discontinuous flow from the tip, the operator merely collapses the bag to a limited extent by slight pressure as for example by the third, fourth and fifth fingers of the hand against the bag, simultaneously increasing the speed of movement of the tip to accommodate for the more rapid flow from the tip. As the pressure of the hand is released, flow from the tip stops immediately until the bag refills, enabling the operator to move the tip to a new position in a sharp clean movement. Flow resumes smoothly without spurting when the feeding pressure again fills the bag 15 tautly.

When the operator is required to decorate a successive line of individual products such as cakes moving past him on a conveyor, he must have positive and quick stop and start control over the flow of decorating material to carry out the task correctly. In this instance decorating will start with a full bag the hand supporting and guiding the bag while the decorating substance flows from the tip under the pressure from the hose. To effect instantaneous stopping of the flow, the pressure of the hand on the bag is momentarily applied and upon release the tip is transferred to the next product and the pressure from the hose will instantly restart the flow when the bag resumes its tautly filled condition. This effects high speed operation without the usual fatigue and yet permits complete freedom for the operator to utilize his decorating skill to the fullest extent.

Figure 5:
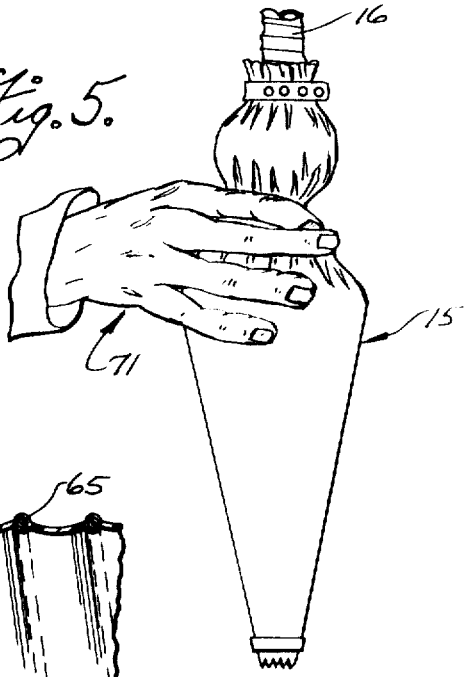
FIG. 5 illustrates one phase of the method taught herein for manual manipulation of the bag to stop flow from the outlet for short time intervals.

In retail bakery establishments operators will often be faced with the requirement to decorate a successive line of products, but on an interrupted product feed basis. Rather than the product being fed to the operator by conveyor, the operator himself may have to feed products in a manual way to his decorating area or they may be fed by a second person. In such cases the flow of products to be decorated will be imperfect as to timing and it is apparent that the operator must stop the flow of decorating substances over a longer period of time to accommodate the intermittent placement of unfinished products in his decorating area. When working under these conditions the operator will generally supply the propelling force for the decorating substance although he can take advantage of the feeding action of the system and avoid this tiresome squeezing provided unfinished products are readily available in his decorating area. Generally under these circumstances the operator will allow the decorating material to flow into the bag until the bag is only partially filled—say approximately two thirds. He will then cause the decorating substance to move to the lower portion of the bag by sliding one hand along the length of the bag until a taut condition is created in the lower bag area. He will then pinch off the bag using the thumb and index fingers as illustrated in FIG. 5 to maintain a taut condition and, by squeezing the side of the bag in the lower area by means of the other fingers, he will propel the decorating substance onto the product to be decorated. In the meantime the upper portion of the bag is being refilled by the continuous flow of material and when the material in the lower portion of the bag has been expelled, either partially or fully, the operator draws on the material in the upper portion by repeating the above steps. The rate of feed from the pump must, of course, be adjusted to that required for this mode of operation. This increases the range of control in the hands of the operator and thus provides him with adequate start and stop flexibility as well as control over the rate of flow, to decorate on an intermittent time cycle and without the necessity of having to stop production to manually fill the bag with topping or the like.

Thus, in summary, according to the method the operator employs a more or less conventional pastry bag and supplies to it a constant supply of decorating material. The operator provides squeezing effort merely to increase the range of control over starts, stops and rate of dispensing. The nominal squeezing and release action of the operator creates a very small void and consequent drop in pressure within the bag when the pressure is released. This void must be refilled by the incoming decorating material before the pressure can be built up to cause a resumption in flow activity. Depending on the force and timing and type of the operator's squeezing action he can create variable time intervals between the cut-off and start of decorating substance flow. Conversely, the softer the squeeze and the more abbreviated the duration of squeeze prior to finishing and transfer, the shorter the time interval before resumption of flow by virtue of the feeding action.

The method and apparatus disclosed herein is well adapted to long lengths of flexible conduit as well as the higher pressures which are required to increase output rates, since manual guiding of the bag tip may be adjusted easily to accommodate greater flow speeds due to the higher pressures. Such measures are impossible with dead end stop and start valves of any kind. Such adjustment will be accomplished by a slightly greater squeeze applied to the flexible bag 15 to temporarily stop the flow of material, and, where longer flow stoppage periods are required, the operator will adjust the point at which he distorts or twists the bag downwardly toward the bag tip to effect a larger area in the upper portion of the bag. When these simple operations are taken together with the variable output speeds, there is no spit, sputter, surge, or ooze of the material at the outlet tip.

The herein described method of depositing decorating material is adaptable for use with a wide range of cake and pastry unit sizes ranging from large, flat sheet forms to round forms i.e. 6", 7", 8", and 10" in diameter, as well as smaller size pastry units in the range of 1" to 2½" in diameter. The method is especially useful with smaller size pastry units because the relatively small amount of decorating material applied to smaller sized units requires greater accuracy of deposit and image control to effect acceptable commercial products. That is to say, "cripples," a term used in the bakery industry to denote a messy or otherwise unacceptable deposit of topping or the like, are more noticeable on smaller size pastry units than on the larger size units.

In addition to accuracy of deposit and image control in the method described, other advantages [accure] *accrue.* A most important additional advantage is that the consuming public gains the benefit of sanitation control since the method employs an essentially closed system. The conventional and oftentimes dirty methods of periodically filling collapsible bags using a spatula or other means is elminated since the bag *15* [28] is continuously supplied with decorating material. Should the environment, equipment, or personal hygiene of the operator be unsanitary when using such manual method, the material may be subjected to filth an infectious bacteria. Sanitation problems are virtually eliminated with the method and apparatus since little, if any, opportunity is occasion for the material to make contact with an unsanitary environment and especially the operator's hands. Furthermore, the operator's production capacity is increased because manual squeezing of bag 15 is minimized. With prior methods the operator must periodically fill the bag as it becomes empty during a production run and each time production time is lost. Moreover, the operator must manually squeeze the bag to force material from the dispensing outlet on successive pastry units which results in fatigue and thus a gradual lowering of the production rate. Apparatus 14 continually supplies topping to the bag, eliminating manual, unsanitary filling of the bag and eliminating difficult and exhaustive hand pressures to force deposition of topping on successive pastry units. The minimal labor required is for him to direct the cone 63 from pastry unit to pastry unit, and, apply a slight squeeze to the bag prior to removal of the cone from such unit to an adjacent unit. Additionally, the working environment of the operator is made easier to keep clean with virtually no waste of material because manual filling of the bag is eliminated. When the bag is filled manually the immediate area in which the operator works often becomes messy and untidy resulting in lost profits to the entrepreneus becaus of wasted material and the necessity for use of clean-up labor.

An important feature of this invention is that the hose and bag are constantly open to the flow of material at all times and no valve operation in the ordinary sense is employed nor is there any valve structure employed to start and stop the flow of material. It is important to note that in the use of start and stop valves there is always a "dead end" whereas with the construction and method herein described there is always an open end. This positively prevents a buildup of pressure in the system upon the stoppage of flow so that upon starting there is no spit or spurt as occurs with positive type valving means.

A further advantage of this invention is the flexibility inherent in it. When pastry and the like is decorated by conventional machine methods the pastry must be properly aligned or arranged and be brought to the decorating station in a precise pattern. When cakes, for example, come from the oven they are usually transferred onto pans or a conveyor in multiple rows for cooling. The cakes are fragile and must be handled carefully and as few times as possible to minimize breakage. With the present invention because the dispensing tip and bag can be freely moved about by the operator the cakes can be decorated directly on the pans or conveyor without transfer or any re-handling and thus breakage is minimized and much labor is saved.

While I have described and illustrated a specific embodiment of the invention by way of example, numerous modifications and changes may be made therein within the spirit of the invention and I do not wish to be limited except as required by the scope of the appended claims.

I claim:

1. The method of decorating a succession of units of pastry or the like with *a highly aerated,* flowable decorating material, *such as whipped cream* including the steps of continuously supplying *the highly aerated* decorating material *under pump pressure through a hose* to a collapsible pastry bag of the type having a supply connection *to the hose* adjacent one end and an open decorating tip adjacent the opposite end, moving the *open decorating* tip over one pastry unit to deposit *the highly aerated* decorating material thereon in a prescribed pattern, manually compressing the bag to collapse the same while so moving the *open decorating* tip to temporarily reduce the capacity of the bag, at least partially releasing the compression on the bag to interrupt flow of *the highly aerated decorating* material from the *open decorating tip,* and moving the *open decorating* tip from one location to another upon release of pressure and interruption of flow *of the highly aerated decorating material from the open decorating tip.*

2. The method of decorating a succession of units of pastry and the like with *a highly aerated,* flowable decorating material, *such as whipped cream* including the steps of continuously supplying *the highly aerated* decorating material *under pump pressure* to a collapsible pastry bag of the type having a supply connection adjacent one end and an open decorating tip adjacent the opposite end, moving the *open decorating* tip over one pastry unit to deposit *the highly aerated* decorating material thereon in a prescribed pattern, manually compressing the bag to collapse the same while so moving the *open decorating* tip to temporarily reduce the capacity of the bag, at least partially releasing the compression on the bag to interrupt the flow of *the highly aerated decorating* material from the *open decorating* tip, and moving the *open decorating* tip from one location to another while *the highly aerated* decorating material flows into the bag to at least partially replace the material displaced therefrom upon compression of the bag.

3. The method of decorating a succession of units of pastry and the like at a decorating station with *a highly aerated,* flowable decorating material[s], *such as whipped cream* including the steps of continuously supplying *the highly aerated* decorating material *under pump pressure* to a collapsible pastry bag of the type having a supply connection adjacent one end and an open decorating tip adjacent the opposite end, adjusting the rate of *said* supply *from the pump* commensurate with the decorating demands, manually moving the tip over one pastry unit to deposit *the highly aerated* decorating material thereon in a prescribed pattern, manually compressing the bag to collapse the same while so moving the tip to temporarily reduce the capacity of the bag, at least partially releasing the compression on the bag to interrupt the flow of *the highly aerated decorating* material from the tip, and moving the tip from one location to another upon release of pressure and interruption of flow *from the tip.*

4. The method of decorating a succession of units of pastry and the like at a decorating station with *a highly aerated,* flowable decorating material, *such as whipped cream* including the steps of continuously supplying *the highly aerated* decorating material *under pump pressure* to a collapsible pastry bag of the type having a supply connection adjacent one end and an open decorating tip adjacent the opposite end, adjusting the rate of supply *of the highly aerated decorating material from the pump* commensurate with the decorating demands to maintain the bag substantially filled, manually moving the tip over one pastry unit to deposit *the highly aerated* decorating material thereon in a prescribed pattern, manually compressing the bag to collapse the same while so moving the tip to temporarily reduce the capacity of the bag, at least partially releasing the compression on the bag to interrupt the flow of *the highly aerated decorating* material from the tip, and moving the tip from one unit to another while the flow *from the tip* is interrupted and while *the highly aerated* decorating material flows into the bag to at least partially replace the material displaced therefrom upon compression of the bag.

5. The method of decorating a succession of units of pastry or the like at a decorating station with flowable decorating material including the steps of continuously supplying decorating material to a collapsible pastry bag of the type having a supply connection adjacent one end and an open decorating tip adjacent the other end, squeezing the decorating material to the lower part of the bag adjacent the decorating tip when the bag is only partially filled, adjusting the rate of supply commensurate with the decorating demands, pinching off the bag intermediate its ends to provide a lower filled bag portion and an upper portion, manually compressing the lower portion of the bag to reduce the capacity thereof and dispense material from the tip while material flows into the upper portion of the bag and simultaneously moving the tip over a pastry unit to deposit decorating material thereon in a prescribed pattern, at least partially reducing the compression on the lower portion of the bag to interrupt the flow of material from the tip, moving the tip from one location to another while the flow is thus interrupted and periodically releasing and reapplying the pinch on the bag to move decorating material into the lower portion of the bag.

6. An apparatus for decorating a succession of pastry units or the like with flowable decorating material comprising a pastry bag of generally conical shape having an unobstructed discharge opening at its apex, a flexible hose of substantially smaller diameter than said bag for conducting material to the bag, means for connecting one end of the hose to the bag opposite said discharge opening, and means for providing a continuing flow of decorating material to said bag *including a pump operatively connected to said hose and cyclically operable means connected to the pump for driving the same,* said bag being flexible and compressible whereby flow from the outlet may be terminated by manually applying pressure to the bag to reduce its capacity and thereafter releasing such pressure to stop flow from the outlet until the bag is refilled.

7. The combination of claim 6 wherein said hose comprises a thin walled tube of synthetic resin and a wire helix embedded in the wall of said tube.

8. [The combination of claim 6 wherein the] *An apparatus for decorating a succession of pastry units or the like with flowable decorating material comprising a pastry bag of generally conical shape having an unobstructed discharge opening at its apex, a flexible hose of substantially smaller diameter than said bag for conducting material to the bag, means for connecting one end of the hose to the bag opposite said discharge opening, and* means for providing a *continuing* flow of decorating material [comprises] *to said bag comprising* a pump having a discharge connected to said hose and a hopper for holding and supplying decorating material to the pump, *said bag being flexible and compressible whereby flow from the outlet may be terminated by manually applying pressure to the bag to reduce its capacity and thereafter releasing such pressure to stop flow from the outlet until the bag is refilled.*

9. The combination of claim 8 including means for controlling the speed of the pump to adjust the rate of flow of decorating material to the bag.

10. [The combination of claim 6 wherein the] *An apparatus for decorating a succession of pastry units or the like with flowable decorating material comprising a pastry bag of generally conical shape having an unobstructed discharge opening at its apex; a flexible hose of substantially smaller diameter than said bag for conducting material to the bag;* means for connecting *one end of* said hose to said bag [comprises] *opposite said discharge opening comprising* an enlarged mounting member on the discharge end of the hose, a strap mounted on the bag adapted to be wrapped around said mounting member with the end of the bag gathered and interposed between the mounting member and the strap and means for retaining the strap in wrapped position; *and means for providing a continuing flow of decorating material to said bag; said bag being flexible and compressible whereby flow from the outlet may be terminated by manually applying pressure to the bag to reduce its capacity and thereafter releasing such pressure to stop flow from the outlet until the bag is refilled.*

11. The combination of claim 8 wherein the pump has a discharge passage provided with a discharge opening and a rigid U-shaped tube connects the discharge opening with the inlet of the hose to direct the hose in an upward loop.

12. The combination of claim [6] *8* wherein the discharge opening of the bag has a rigid discharge cone loosely disposed therein.

13. The combination of claim [6] *8* wherein the hose has [a] *an inside* diameter between about one-half and one and one-quarter inches and the bag has a diameter at its point of largest diameter in the region of five inches.

14. The combination of claim [6] *8* wherein the bag has a length in the region of ten to twelve inches and a diameter at its point of maximum diameter in the region of five inches.

*15. The combination of claim 6 including means for selectively starting and stopping the pump.*

*16. The combination of claim 6 wherein the hose is a thin walled tube of synthetic resin.*

*17. The combination of claim 16 wherein the hose has* [a] *an inside diameter between about one-half and one and one-quarter inches.*

*18. The combination of claim 6 wherein the pastry bag is a disposable bag made of a sheet of synthetic resin.*

*19. The method of decorating a succession of units of pastry and the like at a decorating station with flowable decorating material including the steps of continuously*

*supplying decorating material under pump pressure through a flexible hose to a collapsible pastry bag of the type having a supply connection to the flexible hose adjacent one end and an open decorating tip adjacent the opposite end, adjusting the rate of supply commensurate with the decorating demands, manually moving the tip over one pastry unit to deposit decorating material thereon in a prescribed pattern, manually compressing the bag to collapse the same while so moving the tip to temporarily reduce the capacity of the bag, at least partially releasing the compression on the bag to interrupt the flow of material from the tip, and moving the tip from one location to another upon release of pressure and interruption of flow from the tip.*

*20. The method as set forth in claim 19 wherein the step of adjusting the rate of supply includes adjusting the rate of supply commensurate with the decorating demands to maintain the bag substantially filled; and wherein the last-mentioned step is performed while the decorating material flows into the bag under pump pressure to at least partially replace the material displaced therefrom under compression of the bag.*

*21. An apparatus for decorating a succession of pastry units or the like with flowable decorating material comprising a pastry bag of generally conical shape having an unobstructed discharge opening at its apex, a flexible hose of substantially smaller diameter than said bag for conducting material to the bag, means for connecting one end of the hose to the bag opposite said discharge opening, means including a pump operatively connected to said hose for providing a continuing flow of decorating material through the hose to said bag, said bag being flexible and compressible whereby flow from the outlet may be terminated by manually applying pressure to the bag to reduce its capacity and thereafter releasing such pressure to stop flow from the outlet until the bag is refilled, and means for controlling the pump to adjust the flow of decorating material through the hose to the bag.*

References Cited

The following references, cited by the Examiner, are of record in the patented file of this patent or the original patent.

UNITED STATES PATENTS

| | | | |
|---|---|---|---|
| 1,076,376 | 10/1913 | Kinney | 222—529 X |
| 1,258,322 | 3/1918 | Doellinger | 118—24 X |

FOREIGN PATENTS

| | | |
|---|---|---|
| 193,217 | 2/1923 | Great Britain. |
| 2,742 | 5/1957 | Japan. |
| 15,884 | 10/1939 | Japan. |
| 957,996 | 5/1962 | Great Britain. |

RAYMOND N. JONES, Primary Examiner

U.S. Cl. X.R.

118—14; 222—255